United States Patent [19]

Booker et al.

[11] 4,285,748

[45] Aug. 25, 1981

[54] SELFBONDED NONWOVEN FABRICS

[75] Inventors: Hazael E. Booker; Barrie L. Davies; Alfred J. Hughes; Charles J. Shimalla, all of Charlotte, N.C.

[73] Assignee: Fiber Industries, Inc., New York, N.Y.

[21] Appl. No.: 107,228

[22] Filed: Dec. 26, 1979

Related U.S. Application Data

[60] Division of Ser. No. 881,472, Feb. 27, 1978, Pat. No. 4,211,816, which is a continuation-in-part of Ser. No. 776,565, Mar. 11, 1977, abandoned.

[51] Int. Cl.$^3$ ............ B32B 31/00; D02G 3/00; D04H 3/08
[52] U.S. Cl. ............ 156/167; 156/181; 156/290; 156/296; 428/373; 428/288; 428/296
[58] Field of Search ............ 156/167, 180, 166, 181, 156/290, 296, 306; 264/171, 176 F, 210.7, 210.8; 428/288, 296, 373

[56] References Cited

U.S. PATENT DOCUMENTS

| | | | |
|---|---|---|---|
| 3,231,650 | 1/1966 | Findlay et al. | 428/296 X |
| 3,511,747 | 5/1970 | Davies | 156/181 X |
| 3,536,802 | 10/1970 | Uraya et al. | 264/171 |
| 3,595,731 | 7/1971 | Davies et al. | 428/296 X |

*Primary Examiner*—Lorraine T. Kendell
*Attorney, Agent, or Firm*—Roderick B. Macleod

[57] ABSTRACT

A selfbonded nonwoven fabric comprising at least 70 weight percent of sheath/core heterofilaments having a core of isotactic polypropylene in which the sheaths are high density polyethylene in an amount of 5 to 30 weight percent of the heterofilaments, and method of preparation. The fabrics have outstanding strength, fatigue resistance, and tear resistance and are eminently suitable for civil engineering applications such as unpaved road underlay material.

4 Claims, 7 Drawing Figures

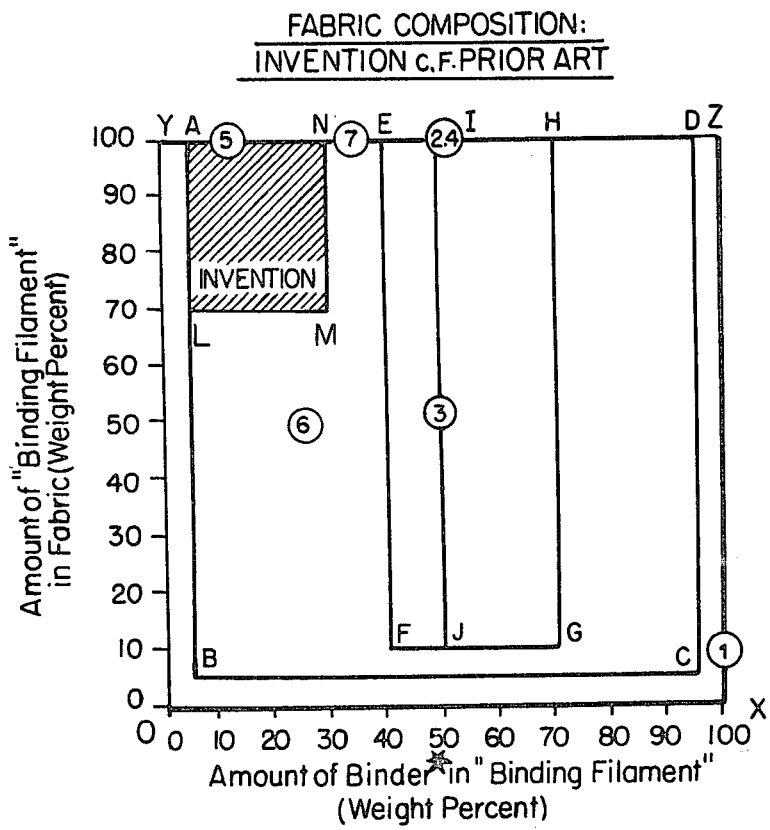

FIGURE 1

FABRIC COMPOSITION: INVENTION c.F. PRIOR ART

KEY TO FIGURE 1

| Point Z | 100% Homofils*, e.g. USP 3,546,062 |
|---|---|
| Line XZ | Mixed Homofils*, e.g. USP 3,914,497 |
| Area ABCD | ICI USP 3,511,747 All Heterofils |
| Area EFGH | Chisso German Off. 2,358,484 Side/Side |
| Area ALMN | Invention, Sheath/Core HDPE Sheath |
| Line IJ | Shimalla Thesis, Side/Side PP/HDPE Examples |
| 1 | USP 3,914,497 Comp. Ex. 8 HDPE Homofil with PP Homofil |
| 2 | Jap. Pat. 50-4767, Ex. 3 Paper "C", LDPE Sheath |
| 3 | Commercial fabric, Nylon Copolymer Sheath |
| 4 | Chisso, Comp. Ex. 2, Side/Side, HDPE Crescent 86% Perimeter |
| 5 | USP 3,511,747, Ex. 24, Nylon Copolymer Sheath |
| 6 | USP 3,511,747, Ex. 23, Nylon Copolymer Sheath |
| 7 | Commercial fabric, Nylon 6 Sheath |

*Binder levels less than 100% correspond to heterofilaments; and a binder level of 100% corresponds to homofilaments.

Transverse Heterofilaments
Prior to Bonding

Transverse Heterofilaments
After Bonding

Parallel Filaments
Prior to Bonding

Parallel Filamements
After Bonding

SELFBONDED NONWOVEN FABRICS

This is a division of application Ser. No. 881,472, filed Feb. 27, 1978, now U.S. Pat. No. 4,211,816, which is a continuation-in-part of application Ser. No. 776,565, filed Mar. 11, 1977, now abandoned.

BACKGROUND OF THE INVENTION (i) Field of the Invention

This invention relates generally to porous nonwoven fabrics formed from selfbonded heterofilaments. More particularly it relates to such fabrics in which the heterofilament has a core of isotactic polypropylene and a sheath; the sheath is high density polyethylene; and the sheath comprises from 5 to 30 weight percent of the heterofilament.

(ii) Description of the Prior Art

It is well known that batts or webs consisting solely of randomly laid thermoplastic homofilaments having essentially identical properties cannot be area-self-bonded commercially by application of heat and pressure to yield a product having both high grab strength and Elmendorf tear strength, on account of extreme criticality of the bonding conditions. For example, du Pont's U.S. Pat. No. 3,546,062 teaches an acceptable bonding temperature range of only a fraction of a degree Centigrade for polypropylene fibers, other conditions being kept constant, and that overbonding results in a cardboard like product. The prior art further shows that the operating range of permissible bonding temperature is greatly increased by deliberately introducing variability into the raw materials and/or processing conditions in many different ways. For example, U.S. Pat. No. 3,231,650, Example 1, teaches that the strength of selfbonded nonwoven webs of drawn high density polyethylene homofilaments having a softening point of 260° F. may be increased by a factor of 10, as measured by manual application of tension to the selfbonded web, by soaking the drawn fibers in hydrocarbon oil for 15 minutes prior to bonding at 83.3 p.s.i. for 5 minutes at 250° F. The patent does not discuss how the hydrocarbon oil causes the increase in strength, but it presumably preferentially plasticizes the amorphous portions of the highly crystalline filaments. Another method of introducing variability is that of using minor quantities of a lower-melting "binder" fiber to effectuate the desired amount of bonding. The binder fiber may be spun as separate filaments from the strength-providing fiber (as in du Pont's U.S. Pat. No. 3,546,062 and Kuraray's U.S. Pat. No. 3,914,497) or it may be co-spun with some or all of the strength-providing fiber to give heterofilaments (as in ICI U.S. Pat. Nos. 3,511,747; 3,423,266; and 3,595,731; and ICI's U.K. Pat. Nos. 1,157,437 and 1,073,181; Chisso's German Offenlegungsschrift No. 2,358,484 and Mitsubishi Rayon's Japanese Patent No. 50-4767; and in "Mechanical Behavior and Bonding in Nonwovens", a dissertation presented to Princeton University by C. J. Shimalla, June 1974).

The ICI patents such as U.S. Pat. Nos. 3,511,747 and 3,595,731, disclose the preamble of applicant's claimed invention, including a general disclosure of polyethylene as the potentially adhesive component of the heterofilament. However, there are no examples directed to high density polyethylene.

Prior art relating to the use of high density polyethylene in filaments includes the following.

Shimalla studied in depth the factors affecting the properties of nonwoven fabrics formed from card webs of mixtures of homofilaments and heterofilaments in which the binder was linear polyethylene in the form of a 50/50 bilateral bicomponent fiber, the conjugate half being isotactic polypropylene, and the fabrics contained up to 50 weight percent of linear polyethylene. Shimalla also points out that sheath/core filaments provide about four times as many bond points as 50/50 bilateral filaments and found that the relative distance between bonds was one of the most critical parameters in filtration applications of these nonwovens. Shimalla further analyses principles of bonding in semicrystalline polymers and points out that the bond strength is determined by a complex combination of physical, chemical and mechanical properties of the materials making up the bond, by the conditions under which the bond is formed, and by the consequent bulk and local stresses. Shimalla's requirements for practical adhesive bonding are: (1) ensure that no weak boundary layer is present on the substrate; (2) use an adhesive having a surface tension less than the critical surface tension of the substrate; (3) form extensive interfacial contacts by the choice of bonding conditions; and (4) set (cure or crystallize) the adheisve to maintain interfacial contacts, prevent frozen stresses, and eliminate weak boundary layers.

U.S. Pat. No. 3,914,497 teaches that high density polyethylene homofilaments used as 10% binder fiber for polypropylene fibers gives a bonded fabric having very low tensile strength (see U.S. Pat. No. 3,914,497 Comparative Example 8).

U.S. Pat. No. 3,620,892 discloses fabrics of fused heterofilaments consisting of minute fibrils which may be polypropylene and polyethylene. No distinction is made between high density polyethylene and low density polyethylene.

U.S. Pat. No. 3,760,046, column 7, teaches the sintering of fabrics with low thread counts in which the filaments have a low density polyethylene sheath and a core of either polypropylene or high density polyethylene.

U.S. Pat. No. 2,861,319 teaches that low density filaments containing non-continuous voids may be prepared by drawing sheath/core filaments in which the core has less extensibility than the sheath, and does not show the use of a high density polyethylene sheath with an isotactic polypropylene core.

U.S. Pat. No. 3,998,988 relates to fibrous material having particulate material studded in the surfaces of the filaments. It discloses a fibrous adsorptive material in the form of tow, web, fabric, sheet, ball or flock consisting of a sheath/core conjugate fiber of a high melting core component and a low melting sheath component, with finely divided particles of an absorbent embedded in the surface of the low melting sheath component. It further teaches that the sheath has a melting point at least 40° C. lower, and preferably 50° C. lower, than the melting point of the core, and polyethylene may be the sheath. Example 20 of the patent discloses fibrous beads formed by heating a tumbled mixture of 55% sheath/core drawn filaments (5 mm long with the core being polypropylene and the sheath being polyethylene having a melting point of 132° C.) with 45% of particulate absorbent material, whereby the absorbing agent particles are melt adhered to filament surfaces and fixed among filaments to form a bead-like fibrous absorbent. The presence of particulate material between two frozen surfaces would be expected to significantly weaken the bond strength.

Chisso's German Offenlegungsschrift No. 2,358,484 discloses nonwoven fabrics comprising crimped bicomponent heterofilaments of polypropylene and high density polyethylene. It does not exemplify sheath/core heterofilaments, but rather rod/crescent side/side heterofilaments approaching sheath/core filaments. It states that there is no particular limitation of the mixture ratio of the two components; that a weight proportion of 40–70% of the lower melting component is preferred; and exemplifies 50–60%. It further teaches that the melt flow ratio of the polypropylene component to the high density polyethylene component should not exceed 5.0 (see Chisso's Comparative Example 2 and claim 1).

Mitsubishi Rayon's Japanese Patent No. 50-4767 relates to a process for manufacturing bicomponent fibers for synthetic fiber paper. It teaches, inter alia, that paper can be made from chopped fibers comprising heat-treated heterofilaments having a polypropylene core and a polyethylene sheath. It further teaches that low density polyethylene is most suitable as compared with high density polyethylene and medium density polyethylene. However, it does not include any actual examples relating to high density polyethylene, and all its examples relate to heterofilaments containing polyethylene having at least 50 percent of the cross-section of the filament being polyethylene (e.g. Table 1 and FIGS. 1A–1E).

Several references relate to nonwoven spunbonded film-fibril sheets of substantially continuous plexifilamentary strands of high density polyethylene. U.S. Pat. No. 3,619,339 discloses a point-bonded product having around 1.3 oz/yd$^2$, tongue tear strength of 2.9 lb and tensile strength of 50 lb/4 in. Similarly an article entitled "Spun bonded sheet products" by Hentschel In CHEMTECH, January, 1974, pages 32–41 gives detailed properties of both area-bonded and point-bonded Tyvek ® sheets. Sheets of weight 1.0–2.7 oz/yd$^2$ have Elmendorf tear strengths of 0.8–3.5 lb, with area-bonded fabrics having Elmendorf tear strength of up to 1.1 lb. "The Properties and Processing of TYVEK ® Spunbonded Olefin" Bulletin S10, published by du Pont in December, 1973 states at page 7 that "While it is possible to fuse TYVEK to itself using heat only, strong seals are difficult to obtain in this way: melting the TYVEK destroys the fiber structure, reducing both the flexibility and tear strength in the seal area. The preferred method is to apply a coating whose melting point is below that of TYVEK, such as branched polyethylene or Surlyn ® A. With such a coating, high seal strengths can be achieved using hot bar or impulse techniques."

The foregoing prior art is shown diagrammatically in FIG. 1 with regard to the two parameters "amount of binder in binding filament" and "weight percent of binding filament in fabric" (see definition of "binding filament" below). Other parameters such as type of heterofilament (sheath/core or side/side) and types of polymer in the heterofilaments are given in the key to FIG. 1.

SUMMARY OF THE INVENTION

In contrast to the forementioned prior art, it has now been discovered that high density polyethylene, having a solid state density in the range from 0.930 to 0.965 gm/cc and having a melt flow index from 1 to 50 as measured in ASTM D-1238, is startlingly superior to low density polyethylene when used as the sheath component in bonded fabrics comprising continuous sheath/core heterofilaments in which the core is isotactic polypropylene, provided that the high density polyethylene comprises from 5 to 30 weight percent of the heterofilaments, particularly for essentially fibrous fabrics containing at least 70 weight percent of heterofilaments. It has also been found that the properties obtained with high density polyethylene are superior to existing commercially available selfbonded heterofilament nonwoven fabrics. Further, processing conditions are relatively critical if these superior properties are to be obtained consistently.

The products have utility as nonwoven fabrics, both industrial and non-industrial, and include for example those uses listed in U.S. Pat. No. 3,341,394, column 28. The fabrics have particular utility for civil engineering applications.

BRIEF DESCRIPTION OF THE DRAWINGS

FIG. 1 compares the prior art with the instant invention.

DESCRIPTION OF THE PREFERRED EMBODIMENTS

Figure 2:
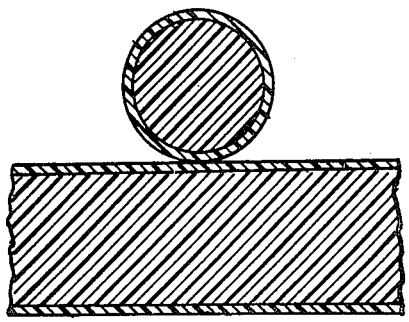
FIGS. 2–5 show enlarged cross-sectional views of typical sheath/core heterofilaments before and after selfbonding.
Figure 3:
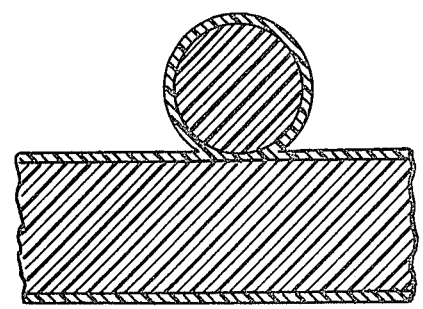
Figure 4A:
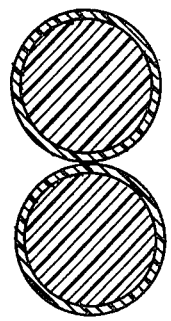
Figure 4B:
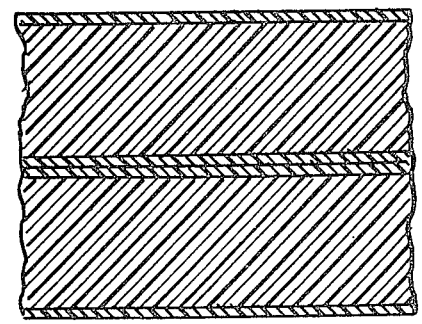
Figure 5A:
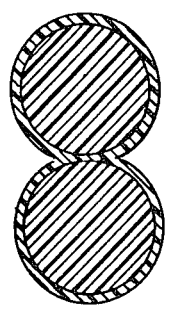
Figure 5B:
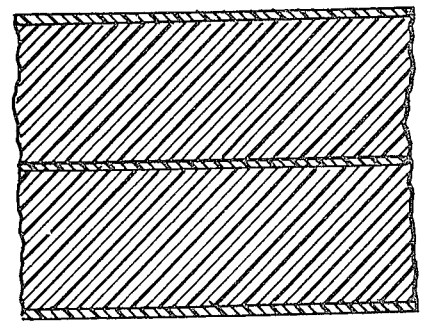

In its broadest aspect, this invention relates to an improved selfbonded nonwoven fabric having a weight of at least 40 gm/meter$^2$ and consisting essentially of fibrous non-particulate material and comprising at least seventy percent, based on total weight of fibers in the fabric, of drawn continuous heterofilaments comprising at least two fiber-forming synthetic polymer components arranged in sheath/core manner, the cores being isotactic polypropylene physically entrapped in a network of bonded sheaths having a melting point at least 10° C. lower than the melting point of the core wherein the improvement comprises the uses as a sheath of high density polyethylene having a solid state density in the range from 0.930 to 0.965 gm/cc and having a melt flow index from 1 to 50 as measured by ASTM D-1238, and the high density polyethylene comprises from 5 to 30 weight percent of the heterofilaments; and the fabric has an Elmendorf tear strength (ASTM D-1424), T, of at least 6 lb and a normalized grab tensile strength, G, of at least 120 lb (ASTM D-1117) for a 140 gm/meter$^2$ fabric and the value of the product TxG is at least 1,200. Such fabrics have greater normalized grab strength (as defined below), fatigue resistance (as defined below), and tear resistance (as defined below), than prior art random nonwoven fabrics. Accordingly, such fabrics are outstandingly suitable for civil engineering applications such as road underlay material requiring high strength and high fatigue resistance.

It is preferred that the value of the product TxG be at least 1800, and most preferably at least 2,300.

It is preferred that the nonwoven fabrics be area-bonded rather than point-bonded.

Homofilaments may be present in the fabrics of this invention in an amount of up to 30 percent by weight. It is preferred that the homofilaments be prepared from the same polymer as the cores of the heterofilaments. It is preferred that the heterofilaments comprise at least 98 percent by weight of fabric, and most preferably essentially 100 percent (Example 5 c.f. Comparative Example 10).

It is preferred that the sheaths comprise 10 to 20 weight percent of the heterofilaments (Example 2 c.f. Example 4 and Comparative Example 8; and Example 5).

It is preferred that the high density polyethylene sheath has a melt flow index in the range 1 to 20. It may comprise up to 5 weight percent of a vinyl monomer, such as 1-hexene, 1-butene, etc. copolymerized therewith, provided that its solid state density is greater than 0.930 gm/cc, and preferably greater than 0.940 gm/cc.

For applications involving filtration it is preferable for the fabric to have a porosity (defined below) in excess of 70 percent. It has been found that the use of high density polyethylene sheath rather than low density polyethylene sheath permits higher porosities to be obtained at equal tensile strength.

It is preferred that the filaments have deniers in the range from 10 to 20.

It is important that the process used results in sheaths that are substantially concentric with their respective cores, otherwise excessive variability of fabric properties may be encountered.

Quench conditions affect the runnability of the process, but surprisingly seem to have relatively little effect on the product properties obtained (Example 2 c.f. Example 1).

The following definitions and test procedures are used throughout the specification, unless otherwise stated.

"High density polyethylene" is a polymer or copolymer of ethylene which has a density greater than 0.930 grams/cc.

"Binding filament" is the type of filament which is selfbonded in a selfbonded nonwoven fabric. It may be a homofilament having a lower melting point than the other filaments in the fabric or be a heterofilament having a lower melting component in at least part of its outer surface.

"Melt flow index" (MFI) was measured by ASTM D-1238.

Polymer melting point was measured by differential thermal analysis (DTA) at the peak.

A vinyl comonomer is a monomer containing a single vinyl group, such as hexene-1 and butene-1.

Nonwoven fabrics were tested on a table top Instron® testing machine using ASTM D-1682 procedure for "grab tensile strength" and "elongation."

"Normalized grab strength" was obtained by multiplying the measured grab strength in lb by 140 gm/meter$^2$ and dividing by the specimen wt/unit area expressed in gm/meter$^2$.

"Hand tearing" is a subjective test and was carried out by cutting a 1 inch nick perpendicular to the edge of the fabric and attempting to propagate that cut by a fast shearing motion of the hands. Fabrics are typically easily hand tearable if the Elmendorf tear is below 6 lb; torn with difficulty if the Elmendorf tear is 7–9 lb; and torn with great difficulty or untearable if the Elmendorf tear is greater than 10 lb.

"Fatigue resistance" was carried out by a procedure similar to ASTM D-1682, except that the fabric was cycled between the limits of 0 to 120 lb at the reduced rate of extension of 5 inches per minute until failure occurred.

"Elmendorf tear strength" was measured by ASTM D-1424.

"Toughness" of a fabric is numerically equal to one two hundredth part of the product of the fabric's tenacity at failure and the fabric's percent elongation at failure; and approximates the energy absorbing ability of the fabric.

"Tensile factor" of a fabric is numerically equal to the product of the fabric's tenacity at failure and the square root of the fabric's percent elongation at failure.

"Porosity" of a fabric is a measure of the free space within a fabric and is expressed as a percentage. It can be calculated for example from data obtained by weighing a fabric of known filamentary composition and filamentary specific gravity and measuring the thickness and area of the fabric.

A novel "test track" test was used to measure relative performance or cycles to failure of fabric under very severe wheel loading traffic conditions on a simulated unpaved road over subgrade of very low load bearing capacity. It is described in detail below.

In summary, a sample of the fabric to be tested is clamped in a no slip condition over a horizontal subgrade of predetermined load bearing capacity and covered by an aggregate of predetermined gradation and compaction. The unit is then cyclicly loaded vertically by reciprocating a loaded trailer tire horizontally until failure of the fabric occurs. The test is monitored by an electronic recording system and deformation is recorded in chart form.

The following definitions are used in this test. "Test track" is the machine described below used to simulate traffic over temporary access roads. "Stabilization performance" is the ability of the fabric to withstand cyclic loading until rupture occurs. "Deformation" is the measured depth of rut at predetermined points.

The test track apparatus consists essentially of:
(A) A trough 18" broad×96" long×27" deep for supporting the subgrade, fabric and aggregate;
(B) A pressurized trailer tire (4 ply, 5.70/5.00-8) mounted on a carriage and at 50 psig tire pressure;
(C) A hydraulic pump for horizontal movement of the tire carriage;
(D) Pneumatic cylinders for vertical load application of wheels; and
(E) An electronic device for recording deformation and number of cycles.

The following outline procedure is used:
1. Prepare subgrade (fine grain soil) having a cohesive strength of 156 lb/ft$^2$ measured by a vane shear device, by (i) adding water to Goose Lake Fire Clay (from Illinois) until the concentration of water is 25 percent by weight and (ii) mix in a mortar mixer until a soil cohesive strength of 156 lb/ft$^2$±12 lb/ft$^2$ is obtained as measured by vane shear (ASTM D-2573).

2. Prepare Modified #7 Crusher Run aggregate by (1) obtaining standard N.C. Type ABC Crusher Run aggregate (approx. 700 lb); (2) removing all stones larger than $\frac{3}{4}$" sieve; (3) air drying the aggregate for about 2 days; (4) sieving aggregate to segregate fines than pass No. 100 sieve, and then restoring some of these fines to the aggregate in an amount of 2% by weight of the aggregate; (5) adding Goose Lake Fire Clay in an amount of 2% by weight of aggregate; and (6) adjusting aggregate moisture content to a level of 6–7% by weight as measured by a conventional Troxler Nuclear Moisture-Density Gauge.

3. Fill trough with the subgrade to a depth of 12 inches and level by hand tamping.

4. Place sample of fabric directly on subgrade and secure fabric on all sides so that the fabric is taut and in a no slip condition but not tensioned significantly. (This step is simplified by having the trough split horizontally at a depth of 12 inches).

5. Place 4 inches of aggregate on top of the fabric and compact to a wet density of 140 lb/ft$^3$ at 7% moisture content by weight.

6. Set the tire pressure to 50 psi±1.0 psi.

7. Set the vertical wheel load, L, to 560 lb for soil cohesive strength, c, of 156 lb/ft$^2$. For variations in soil cohesive strength between the allowable values of 144 lb/ft$^2$ and 168 lb/ft$^2$, $$L = 3.59 \, c$$

8. Run the test track at a linear horizontal velocity of 1 ft/sec in a laboratory at 70° F. and 50% relative humidity, and record the number of cycles to failure, i.e. when subsoil extrudes through the aggregate. In addition, it is normal in the test to measure the deformation at predetermined points at predetermined intervals; to recheck the shear strength and moisture content of the subgrade at the end of the test; and to note the zone in which failure of the fabric occured.

The following Examples illustrate the invention and the preferred embodiments.

The Comparative Examples are not prior art, but show the surprising nature of the invention. The invention is not limited to these Examples, which are merely given for purposes of illustration.

Examples 1–5 illustrate the invention. Examples 6–11 are Comparative Examples.

EXAMPLE 1

Hercules 6323 polypropylene (a high flow, maxiumum stiffness, fiber grade polymer having an $MFI_{230}$ of about 10 gm/10 min., and a solid state density of 0.903 gm/cc) and USI's LS506 high density polyethylene (with a density of 0.949 gm/cc, a Vicat softening point of 123° C. by ASTM D-1525, $MFI_{190}$ of 6 gm/10 min. by ASTM D-1238, DTA peak method melting point of 127° C., and apparently a vinyl comonomer content of about ½ percent) were spun in a core/sheath configuration through a 300 hole 0.030" diameter 2:1 L/D scatter pattern spinneret at 17.15 lb/hr and 2.5 lb/hr respectively.

The spun polypropylene had an $MFI_{230}$ of 20 gm/10 min. whilst the sheath polyethylene had an $MFI_{190}$ of 7 gm/10 min. The pack was jacketed with Dowtherm ® at 200° C. and the filaments were quenched by cross flow air in the following manner. Two hundred cubic feet of air at ambient temperature (about 70° F.) was blown each minute across the threadline. The quench unit consisted of fine mesh metal screens 2 feet long and 1 foot broad arranged to give a velocity profile of 250 ft/min at a distance 2½ inches below the spinneret and decreasing approximately linearly to 50 ft/min at a distance of 2 feet 2½ inches below the spinneret. The filaments, containing 12.7% of high density polyethylene sheath, were taken around a heated roll (115° C.) at 1000 fpm and drawn to a draw ratio of 3.2 by taking several wraps around a heated draw roll (100° C.). The drawn filaments were fed to a traversing pneumatic spray gun, charged electronegatively and deposited as a uniform web on a moving conveyor.

The web was taken from the conveyor and passed through a drum type hot air bonding oven at 85 fpm. The web was restrained on the drum by a 50 mesh steel belt exerting a pressure of 40 gm/cm$^2$ on the web whilst air at 145° C. was passed through it. On exiting from the oven the web was passed through a calender with a nip load of 3 Kg/cm. One of the rolls was rubber covered whilst the other was smooth steel. The resulting fabric had the properties listed in Table 1.

EXAMPLES 2a and 2b

Webs were made in a similar manner to Example 1 except that a 378 hole 0.025" 10:1 L/D spinneret and outflow quench were used. Dowtherm ® temperature was set at 220° C. The pack throughput was adjusted to give a 7.5 dpf core of $MFI_{230}$ 10 gm/10 min. polypropylene with: (a) a 13% sheath and (b) an 18% sheath of $MFI_{190}$ 17 gm/10 min. high density polyethylene. The following outflow quench conditions were used. One hundred and sixteen cubic feet of air at ambient temperature (about 70° F.) was blown radially outwards from a quench stick 20 inches long. The top of the quench stick was 1 inch below the spinneret and the quench stick consisted of a 1⅜ inch outer diameter perforated aluminum pipe surrounded by polyurethane foam ⅜ inch thick. The hole spacing in the aluminum pipe was adjusted to give a velocity profile increasing approximately linearly from the top of the quench stick to a maximum at the bottom of the quench stick. The threadline speed and draw ratio was the same as in Example 1 but the feed roll was heated to 110° C. whilst the draw roll was at ambient temperature.

The webs were bonded at 33 fpm in a flatbed hot air oven, by passing air at 130° C. through the web and nipping the heated web with a load of 9 Kg/cm in a rubber/steel calender of about one centimeter contact length in the machine direction. The bonded fabrics had the properties listed in Table 1. The runnability of the process was superior to the runnability of Example 1, apparently because of the different quench conditions.

EXAMPLE 3

Using the same pack and quench system as in Example 2, web was made with a core $MFI_{230}$ of 22 gm/10 min. and a sheath $MFI_{190}$ of 9 gm/10 min. The sheath level was set at 10.7%. On this occasion both feed and draw rolls were at ambient temperature. The web was bonded with 50 psig saturated pressure steam by passing the web sandwiched between cotton belts through pneumatic seals into and out of a 2 ft. long pressure chamber. The seal pressure wa 60 psig and the belt speed was 22 fpm. The resulting fabric had the properties listed in Table 1.

TABLE 1

| | PROPERTIES OF HIGH DENSITY SHEATED FABRICS | | | | | |
|---|---|---|---|---|---|---|
| Example | Web Wt. gm/ meter$^2$ | Grab Strength lb/4" | Elongation % | Elmendorf tear lb | Fatique Resistance cycles/ failure | Test Track cycles/ failure |
| | 140 | 211 | 61 | 13.7 | — | 1380 |
| 2a | 140 | 250 | 82 | 13.7 | 1000 | 1100 |
| 2b | 140 | 274 | 105 | 8.9 | 1000 | 1590 |
| 3 | 156 | 152 | 119 | 15.8 | 849 | 1140 |

EXAMPLE 4

Webs were made according to the process described in Example 1 except that the sheath level was reduced to 7.0%. The polypropylene $MFI_{230}$ was 23 gm/10 min. and the feed roll temperature was 90° C. After bonding by the process described in Example 3 the fabric exhibited the following properties: grab strength of 126 lb;

elongation of 112%; and Elmendorf tear strength of about 15.8 lb.

EXAMPLE 5

Fabric was produced in the same manner as Example 1, except that the filaments were about 9.5 d.p.f. rather than 5 d.p.f. and bonding was effected with 50 psi steam pressure rather than hot air. The product had the following properties for sheath/core ratios in the range 13/87 to 28/72: grab tensile strength of 178–191 lbs; and elongation of 80–120%. The hand tear strengths ranged from impossible to tear for 13/87 to tearable for 28/72.

Examples 6 and 7 are Comparative Examples using low density polyethylene sheath.

EXAMPLE 6 (Comparative)

A 200 hole 0.015" spineret was used with a 4/3 L/D. The polypropylene core (ICI's PXC3924) was extruded with an $MFI_{230}$ of 19 gm/10 min., while the sheath polymer was low density polyethylene (0.923 gm/cc) (ICI's Alkathene ® XRM40) which was extruded with an $MFI_{190}$ of 22 gm/10 min.

Pack throughput was 39.6 lb/hr at a spinning temperature of 265° C. and the core/sheath ratio was 80/20. The filaments were cooled by an outflow quench system as in Example 2 and the filaments were pulled away from the pack at 1000 fpm. After drawing to a draw ratio of 4 with rolls at ambient temperature, the filaments were sprayed to form a web as in the previous examples. The web was bonded with 10 psi pressure steam as in Example 3 with the inlet and outlet seal pressure being 18 and 14 psi respectively. Properties of the fabric are listed in Table 2.

EXAMPLE 7 (Comparative)

Using the same pack and spinning conditions as in Example 6, the throughput was adjusted to 31.4 lb/hr, the sheath level to 30% and the feed roll and draw roll speeds to 1000 fpm and 4500 fpm respectively. The resulting web of 8.7 dpf filaments was bonded with 16 psig saturated pressure steam with inlet and outlet seal pressures of 31 and 22 psig respectively. The properties of the fabric are given in Table 2.

TABLE 2
PROPERTIES OF LOW DENSITY SHEATED FARBICS

| Example | Web Wt. gm/meter² | Grab Strength lb/4" | Elongation | Elmendorf tear lb | Fatique Resistance cycles/ failure | Test Track cycles failure |
|---|---|---|---|---|---|---|
| 6 | 134 | 116 | 59 | 9.5 | — | 216 |
| 7 | 142 | 207 | 76 | 5.3 | 678 | 246 |

It will be particularly noticed that the fabrics of Comparative Examples 6 and 7, as compared with the fabrics of the invention shown in Examples 1–3, had much lower life (as measured by fatigue resistance and test track cycles to failure tests) and much lower toughness (which is proportional to the product of grab strength and elongation) and/or much lower Elmendorf tear strength. It should also be remembered that the prior art teaches that, by changing bonding conditions such as temperature and pressure, and/or binder level, grab tensile strength can be increased at the expense of tear strength.

EXAMPLE 8 (Comparative)

Hercules 6323 polypropylene and USI LS506 high density polyethylene, each polymer having the properties shown in Example 1, were spun in a core/sheath configuration through a 300 hole (scatter pattern) spinneret, with 0.025" hole diameter and 0.250" hole length, at 7.5 lb/hr and 2.5 lb/hr, respectively. The core polypropylene had an $MFI_{230}$ of 50 gm/10 min while the sheath polyethylene had an $MFI_{190}$ of 7 gm/10 min. The filaments were quenched by cross-flow air as in Example 1, taken around a roll at 1500 ft/min. and drawn to a draw ratio of 2.5. The feed and draw rolls were at ambient temperature. This combination of process variables resulted in a drawn denier per filament of 2.0.

The drawn filaments were fed to a traversing pneumatic spray gun, charged electronegatively, and deposited as a continuous filament web on a conveyor the speed of which was adjusted to give the desired weight per unit area. The web was taken from the conveyor and passed through a saturated steam bonding oven at 148° C. for 6 seconds. Steam pressure was maintained in a chamber by air bags at 60 psig. Under these conditions, the bonded nonwoven fabric had a weight of about 1 oz/yd², and the following properties:

| | | |
|---|---|---|
| 1" strip tensile test | 9.8 lb/in / oz/yd² | at 56% elongation (ASTM D-1682) |
| Elmendorf tear test | 3.5 lb | |

EXAMPLE 9 (Comparative)

Fabrics were made in a similar manner to Example 1 except that a 193 hole 0.025" 10/1 L/D spinneret was used. The core polypropylene throughput was 19.4 lb/hr whilst that of the sheath was 2.83 lb/hr. Both core and sheath polymers contained 2% carbon black supplied in the form of a 35% concentrate in a low density polyethylene carrier. The Dowtherm ® temperature was 220° C. whilst the feed and draw foil temperatures were 100° C. and 110° C. respectively. The resulting 140 gm/meter² webs were bonded as in Example 3 and yielded a fabric with the following properties: grab strength of 112 lb and grab elongation of 106%. When subjected to 250, 2 hr. cycles of 1 hr. 40 mins. light, 20 mins. water spray and light in a carbon arc Weatherometer (ASTM G23) the sample retained 88% of its original strength, whilst a control sample without carbon retained only 11% of its original strength. A similar fabric containing only 1% of carbon retained 100% of its strength in the same test. This example shows that even small amounts of particulate material intimately blended within the filaments adversely affects their original strength.

EXAMPLE 10 (Comparative)

Fabric was made in the same manner as Example 5 except that the filaments were about 10 d.p.f. rather than 9 d.p.f. and the product consisted of a blend of 50% heterofilaments with 50% polypropylene homofilaments. The product had the following properties: grab tensile strength of 132 lb and elongation of 56–77%. This fabric is not within the claimed composition, and shows the inferior properties obtained when the fabric contains less than 70 percent heterofilaments.

EXAMPLE 11 (Comparative)

Drawn filaments were prepared exactly as in Comparative Example 8. Thereafter the filaments were taken up on bobbins, placed on a creel, crimped to 10 crimps per linear inch and 25% crimp, and cut into 1.5 inch staple. The staple fibers were then opened, carded, and layered on a rotating drum. The nonwoven fabric bonded under the conditions employed in Comparative Example 6 had a weight of about 1 oz/yd² and the following properties:

| 1″ strip tensile test | 9.2 $\frac{lb/in}{oz/yd^2}$ at 44% elongation (by ASTM D-1682) |
|---|---|
| Elmendorf tear test | 1.8 lb |

This fabric is not within the claimed composition, and shows the inferior properties obtained when staple fiber is used rather than continuous filaments as in Comparative Example 8.

What we claim is:

1. An improved process for preparing a fabric having an Elmendorf tear strength (ASTM D-1424), T, of at least 6 lb. and a normalized grab tensile strength, G, of at least 120 lb. (ASTM D-1117) for a 140 gm/meter² fabric, and the value of the product $T \times G$ being at least 1,200 by a process comprising the steps of melt spinning sheath/core heterofilaments, drawing the spun filaments, laying the drawn filaments to form an unbonded web, and thereafter bonding the web by the application of heat and pressure to form a selfbonded nonwoven fabric without using solvents that are relatively nonvolatile at the bonding conditions, wherein the improvement comprises:

(i) melt spinning sheath/core heterofilaments, wherein said sheath is high density polyethylene having a solid state density in the range from 0.930 to 0.965 gm/cc and having a melt flow index from 1 to 50 as measured by ASTM D-1238, and wherein said high density polyethylene comprises from 5 to 30 weight percent of said heterofilament;

(ii) drawing said spun heterofilaments at a draw ratio within the range 2.0 to 6.0, at a temperature up to 120° C.; and (iii) bonding said unbonded web at a temperature of from 120° to 155° C. at a nip stress in the range of 50 to 140 pounds per square inch, whereby said sheaths are softened.

2. The process of claim 1 which comprises drawing said spun heterofilaments at a draw ratio less than 5.

3. The process of claim 1 which comprises drawing said spun heterofilaments at a draw ratio less than 3.6.

4. The process of claim 1 wherein said heterofilaments are concentric sheath/core filaments, said sheath comprising from 10 to 20 weight percent of said heterofilaments.

* * * * *